Jan. 16, 1973   C. C. ROBINSON ET AL   3,711,264
METHOD FOR PRODUCING A FARADAY ROTATION
GLASS HAVING A HIGH VERDET CONSTANT
Original Filed March 26, 1969   2 Sheets-Sheet 1

INVENTORS
CHARLES C. ROBINSON
ROBERT E. GRAF
ROBERT W. YOUNG
MERRILL F. SPROUL

AGENT

INVENTORS
CHARLES C. ROBINSON
ROBERT E. GRAF
ROBERT W. YOUNG
MERRILL F. SPROUL

AGENT 3,711,264
METHOD FOR PRODUCING A FARADAY ROTATION GLASS HAVING A HIGH VERDET CONSTANT

Charles C. Robinson, Sturbridge, Mass., Robert E. Graf, Southbridge, and Robert W. Young, Woodstock, Conn., and Merrill F. Sproul, Sturbridge, Mass., assignors to American Optical Corporation, Southbridge, Mass.
Original application Mar. 26, 1969, Ser. No. 810,539. Divided and this application Mar. 8, 1971, Ser. No. 121,813
Int. Cl. C03b 5/16, 29/00; C03c 3/00
U.S. Cl. 65—134          7 Claims

ABSTRACT OF THE DISCLOSURE

Glass containing a substantial amount of cerium in the form of cerous ($Ce^{+3}$) ions is prepared by fusing ceric oxide and dibasic ammonium phosphate, which reduces the ceric ions to cerous ions, and in certain instances antimony oxide is added to improve the ratio of cerous to ceric ions. Remelting cerium glass in argon atmosphere reduces any ceric ions to cerous ions, providing a clear glass.

---

This application is a division of our copending application, Ser. No. 810,539, filed Mar. 26, 1969, now abandoned.

Figure 1:
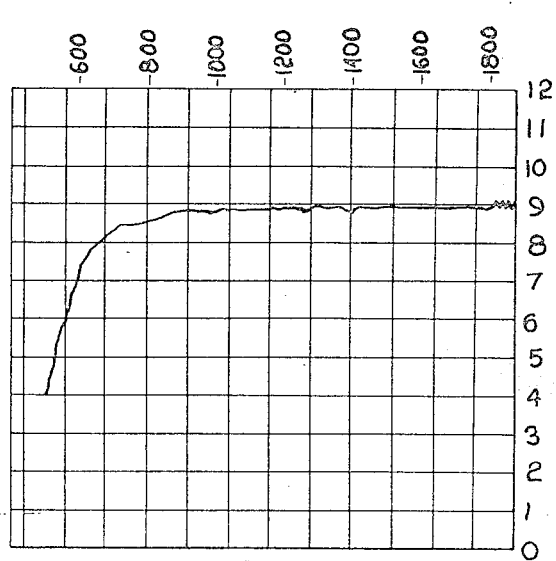
FIG. 1 is a graph showing a typical transmission of a glass of this invention melted in air.

A Faraday rotation phenomenon observed in certain types of glasses has found considerable use with the laser type optical system, and the Faraday rotation effect has been found useful in such devices as optical modulators, isolators, circulators, gyrators and the like. As the uses of lasers have increased the interest in Faraday rotating materials has likewise increased. It is known that cerium containing glass produces the Faraday rotation effect, and the specific rotation of the cerium glass varies essentially linearly with the concentration of cerium ion. It has, furthermore, been found that the rotation is in effect due to the cerous ion, which is the +3 valence state of the cerium ion, which is the +3 valence state of the cerium ion, whereas the presence of ceric or the +4 valence state of the metal detracts from the rotating ability. It is a recognized chemical fact that the cerous ion is easily oxidized to the ceric ion, and the prior art used an elaborate procedure to control the reduced state of the element. It is known in the prior art that as the amount of the ceric ion increases the glass colors from yellow to dark brown. One process of preparing cerium containing glass is described in U.S. Pat. No. 3,298,811 issued Jan. 17, 1967. In this process, the patentees start with a cerium compound with the cerous ion, $Ce_2(CO_3)_3 \times 5H_2O$. The process involves fusing cerous carbonate with ammonium phosphate fired in a platinum crucible with an inert atmosphere maintained over the melt at all times to prevent an oxidation of the cerous ion.

According to the present invention there is produced a cerium containing glass with sufficient cerous ions to produce an effective Faraday rotation glass. In one aspect of the invention, ceric oxide is fused with dibasic ammonium phosphate to produce a very high percentage of cerous ions in the resulting glass. The melting does not need to be performed in an inert atmosphere, and the reason for obtaining the resulting cerous ions in the glass from the starting ceric ions is not completely understood. In a second aspect, minor amounts of antimony oxide in the melt improves the ratio of the cerous to ceric ions. Another aspect of the invention involves remelting cerium glass in an inert atmosphere to reduce the ceric ion content and increase the cerous ion content of glass.

A very important feature of the invention is the starting cost of the raw materials. It is well known that high purity ceric oxide is less expensive than the high priced cerous carbonate. In addition, the saving is more pronounced when it is considered that the cerous carbonate compound contains only 51% of cerium, and the water of crystallization and $CO_2$ is expelled from the melt during heating producing cerous oxide. This is compared with 81% of cerium in the ceric oxide, which fuses with the phosphate with little loss.

High Verdet constant glasses have, also, been made by doping various glass bases with other rare earths of the lanthanide series, such as the +3 valence state compounds of praseodymium, dysprosium, terbium, etc. All commercially available rare earth compounds are considerably more expensive than the ceric oxide, for example, $Tb_4O_7$ is more than a hundred times more expensive than the ceric oxide. In addition, the cerium glass, containing the +3 valence state of cerium, is the only one free of absorption bands in a very wide wavelength range.

Included among the objects and advantages of the present invention is an economical method for producing a glass with a high content of the +3 valence state cerium ion.

Another object and advantage of the invention is an economical method for producing cerium glass having a minimum amount of the +4 valence state of the cerium ion.

A further object of the invention is to provide clear paramagnetic, Faraday rotation rare earth glasses with no absorption bands in the violet, visible and near infrared wavelength regions.

A still further object of the invention is to provide a process for doping sodium germanate glass with cerium to produce a Faraday rotation glass.

Another object of the invention is to provide a process for reducing the +4 valence state cerium ions in cerium Faraday rotation glasses to the +3 valence state cerium ions.

These and other objects and advantages of the invention may be readily ascertained by referring to the following examples of the processes of the invention and to the tests of the glass resulting thereby.

Example I

Figure 2:
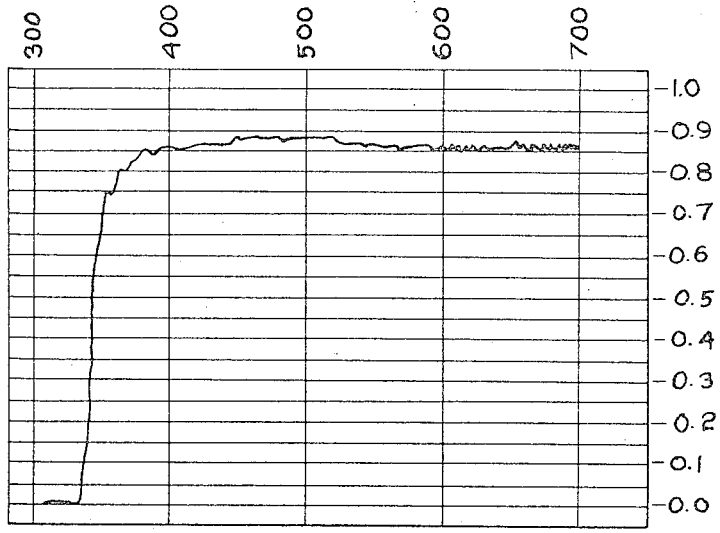
FIG. 2 is a graph similar to FIG. 1.

A mixture of ceric oxide and dibasic ammonium phosphate on a weight ratio of one to three was melted in air in a glow bar furnace. The melting schedule for the cerium glass was filled at about 2400° F., melted and stirred at about 2600° F. and was cast at 2600° F. The usable range of ratio of the cerium compound to the phosphate compound ranges from 1 to 4 to 1 to 1.875. The larger the ratio the greater the cerium concentration in the finished glass and the larger the Verdet constant of the resulting glass. At a ratio of about 1 to 3 the glass melted in air contains almost entirely cerous ions, and the resulting glass is clear. As the amount of cerium in the glass increases the characteristic brown color of the +4 valence state of the cerium ion may, also, appear. Although the net concentration of the +3 valence state of cerium increases (the Verdet constant increases with the increasing ratio) the presence of the +4 valence state of the cerium ion is detrimental as it decreases the transmission of the glass in visible, violet, and ultraviolet regions. The graph of FIG. 1 shows a typical transmission curve for the high ratio glass melted in air and it is evident that this glass is useful for wavelengths between 0.9 to $1.8\mu$ where the absorption is about 0.02 cm.$^{-1}$. The graph of FIG. 2 shows the transmission curve of a glass produced from a mixture ratio of 1 to 3 and it possesses so little of the +4 valence state of cerium ion that it is undetectable in an optical spectrum. The sharp ultraviolet cut-off at $.350\mu$ is due to the +3 valence state of the cerium ion.

Typical values of the Verdet constant of two glasses at room temperature of the composition set forth in the table, are shown in the following table:

TABLE I
($\lambda = .546$)

| Sample: | Verdet constant (min./oe.-cm.) | Parts | |
|---|---|---|---|
| | | $CeO_2$ | $(NH_4)_2HPO_4$ |
| 1 | −0.160 | 1 | 3 |
| 2 | −0.222 | 1 | 2 |

The Verdet constant is a measure of the light rotating properties of magnetic materials which is accepted in the industry. The constant is expressed in units of minutes of arc rotation per centimeter-oersted.

Example II

Figure 3:
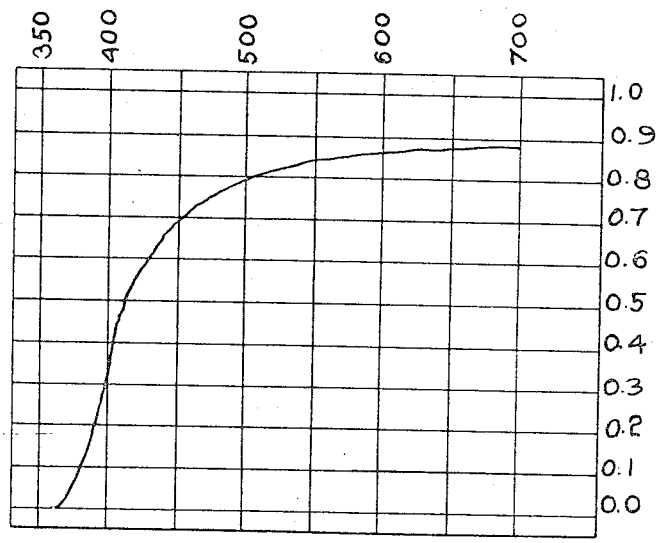
FIG. 3 is a graph showing transmission of the glass of this invention with antimony oxide included.

The addition of antimony oxide ($Sb_2O_3$) to the cerium glass eliminates substantially all the +4 valence state of the cerium ion. The amount of antimony oxide added varies from batch to batch at the various ratios, for example, in a 36 gram batch of the 1 to 2 ratio cerium glass, from 0.5 to 2.0 grams of the antimony oxide were found very effective in reducing the +4 valence state cerium ions. The larger amount of the antimony oxide produced the clear glass. The graph in FIG. 3 shows a typical transmission through the glass with the antimony oxide inclusion, and it is seen that the transmission range of this glass extends well into the red wavelength range. The Verdet constant of this glass was −0.204 min./oe.-cm. at $0.546\mu$.

Example III

Figure 4:
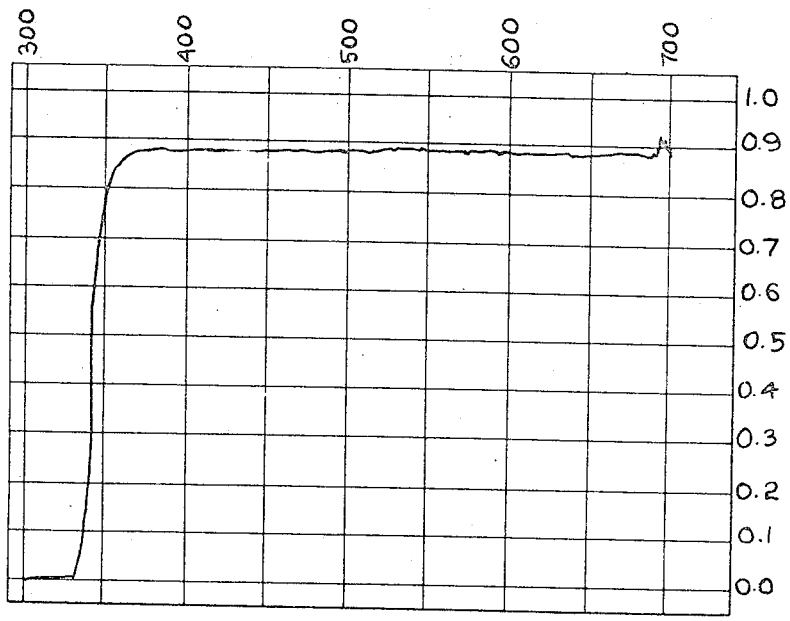
FIG. 4 is a graph showing typical transmission characters of a clear glass of this invention.

The brown color in cerous phosphate glass indicates that the +4 valence state cerium ion is present. This ion has a light absorption capacity that seriously reduces the transmission of the glass in the visible and near ultraviolet wavelength ranges. The presence of this ion does not significantly reduce the Verdet constant of the glass, but it contributes nothing to the paramagnetic Faraday effect. It is highly desirable, therefore, to reduce the residual +4 valence state cerium ions to the useful and non-absorbing +3 valence state cerium ions. Cerium phosphate glass made in accordance with Example I but having a brownish color is remelted in an argon atmosphere so that the +4 valence cerium ions are reduced to the +3 valence state cerium ions in the following manner. The glass was melted in an enclosed induction furnace under argon gas at 4 p.s.i. in an alumina crucible with a graphite susceptor. The glass melted in the temperature range of 1710–2390° F. It started to fume at 2435° F. It was held at 2550–2600° F. for one hour during which time the glass continued to fume noticeably. Applicants have found that moderate fuming of the melt is essential to reducing the remaining $Ce^{+4}$ to $Ce^{+3}$. The glass, at the end of the hour, was then cast into a graphite mold which was preheated to about 1100° F. The graph of FIG. 4 shows typical transmission characteristics of this resulting clear glass.

The Verdet constant of two glasses formed by the process are given in Table II below:

TABLE II

| | $\lambda$ in $\mu$ | | | |
|---|---|---|---|---|
| | 0.546 | 0.492 | 0.4358 | 0.4047 |
| | Verdet constant (min./oe.-cm.) | | | |
| Sample: | | | | |
| 3 | −0.199 | −0.275 | −0.405 | −0.536 |
| 4 | −0.216 | | | −0.580 |

Example IV

A dark brownish glass was made by melting germanium oxide, sodium oxide and cerium oxide in a crucible according to standard practices. The weight percent of the various ingredients is shown as follows:

| | Weight percent |
|---|---|
| $GeO_2$ | 75.01 |
| $Na_2O$ | 10.77 |
| $CeO_2$ | 14.22 |

To reduce the dark brown color of the glass to transparent yellow-brown, the glass was remelted in a controlled, inert atmosphere furnace. The glass was placed in an alumina crucible, the furnace was evacuated and refilled with argon gas. The temperature of the glass was raised to about 2000° F. the pressure of the atmosphere over the melt was increased to 6 p.s.i. by the addition of CO gas into the furnace. The temperature of the melt was then increased to approximately 2200° F. At this temperature, the melt began to fume heavily and it was held for about two and one-half hours under these conditions. The glass was then cast. The ultra-violet absorption edge of the resulting glass was in the vicinity of $0.400\mu$. The Verdet constants of the resulting glass at two wavelengths were as follows:

TABLE III

| Wavelength: | Verdet constant (min./oe.-cm.) |
|---|---|
| $0.4047\mu$ | −0.237 |
| $0.4358\mu$ | −0.159 |

These values are roughly twice those for untreated dark glass.

In a preferred embodiment, melting and/or remelting of the glass mixtures is conducted in a non-metallic crucible, usually alumina, and the stirrer is made of a similar material. This prevents metal inclusions, from metallic parts, in the resultant glass.

We claim:
1. A method for producing a Faraday rotation glass having a high Verdet constant comprising the steps of
   fusing a mixture of a major portion of a glass forming compound selected from the group consisting of $P_2O_5$ and $GeO_2$, and a minor amount of $CeO_2$,
   maintaining the mixture at fusion temperature for a sufficient period of time to convert a preponderance of the cerium ions to a trivalent state from a quadrivalent state, as the fused mixture changes from a brown coloration associated with the quadrivalent state to a transparent state associated with the trivalent state, and
   casting the resultant mixture to produce a glass having predominantly trivalent cerium ions.
2. A method according to claim 1, wherein the glass-forming compound is $GeO_2$ and the mixture also contains a minor amount of $Na_2O$.
3. A method according to claim 1, wherein the glass-forming compound is $P_2O_5$.
4. A method according to claim 3, wherein a minor amount of $Sb_2O_3$ is included in the mixture.
5. A method according to claim 1, wherein the fol- lowing additional steps are performed.
- remelting the cast glass in an atmosphere selected from the group consisting of inert and reducing,
- maintaining the melt at the melting temperature for a period of time sufficient to convert essentially all of the cerium ions to the trivalent state, and
- casting the resulting glass.

6. A method according to claim 5, wherein the atmosphere is reducing and is at least partially comprised of CO.

7. A method according to claim 6, wherein the atmosphere is inert and is at least partially comprised of argon.

References Cited

UNITED STATES PATENTS

| | | | |
|---|---|---|---|
| 3,032,428 | 5/1962 | Ginther | 65—Dig. 2 |
| 3,134,019 | 5/1964 | Bishay | 65—Dig. 2 |
| 3,052,637 | 9/1962 | Bishay | 65—Dig. 2 |
| 3,278,319 | 10/1966 | Cohen | 65—Dig. 2 |
| 3,298,811 | 1/1967 | Kurkjian et al. | 65—32 X |
| 3,345,190 | 10/1967 | Albinak et al. | 65—32 X |
| 2,908,838 | 10/1959 | Nordberg | 65—32 X |
| 3,527,711 | 9/1970 | Barber et al. | 65—32 X |

OTHER REFERENCES

Handbook, Glass Manufacture, vol. II, Fay V. Tooley, Ogden Publ. Co., 1960, pp. 187 to 199.

FRANK W. MIGA, Primary Examiner

U.S. Cl. X.R.

65—33, 32, DIG. 2; 106—47 R, 47 Q, 52